(12) United States Patent
Saini et al.

(10) Patent No.: US 10,943,497 B2
(45) Date of Patent: Mar. 9, 2021

(54) PERSONALIZED E-LEARNING USING A DEEP-LEARNING-BASED KNOWLEDGE TRACING AND HINT-TAKING PROPENSITY MODEL

(71) Applicant: ADOBE INC., San Jose, CA (US)

(72) Inventors: Shiv Kumar Saini, Bangalore (IN); Ritwick Chaudhry, Bangalore (IN); Pradeep Dogga, West Bengal (IN); Harvineet Singh, Bengaluru (IN)

(73) Assignee: Adobe Inc., San Jose, CA (US)

( * ) Notice: Subject to any disclaimer, the term of this patent is extended or adjusted under 35 U.S.C. 154(b) by 384 days.

(21) Appl. No.: 15/964,869

(22) Filed: Apr. 27, 2018

(65) Prior Publication Data

US 2019/0333400 A1    Oct. 31, 2019

(51) Int. Cl.
*G09B 7/00* (2006.01)
*G06N 7/00* (2006.01)
*G09B 5/06* (2006.01)
*G06N 20/00* (2019.01)

(52) U.S. Cl.
CPC .............. *G09B 7/00* (2013.01); *G06N 7/005* (2013.01); *G06N 20/00* (2019.01); *G09B 5/065* (2013.01)

(58) Field of Classification Search
CPC ...................................................... G09B 7/00
USPC ...................................................... 434/353
See application file for complete search history.

(56) References Cited

U.S. PATENT DOCUMENTS

2013/0034839 A1 * 2/2013 Heffernan .............. G06Q 50/20
434/350

OTHER PUBLICATIONS

Zhang, J., Shi, X., King, I., & Yeung, D. Y. (Apr. 2017). Dynamic key-value memory networks for knowledge tracing. Ir Proceedings of the 26th International Conference on World Wide Web (pp. 765-774). International World Wide Web Conferences Steering Committee. (Year: 2017).*

Zhang, J., Shi, X., King, 1., & Yeung, D. Y. (Apr. 2017). Dynamic key-value memory networks for knowledge tracing. Ir Proceedings of the 26th International Conference on World Wide Web (pp. 765-774). International World Wide Web Conferences Steering Committee. (Year: 2017) (Year: 2017).*

Aleven, V., Stahl, E., Schworm, S., Fischer, F., & Wallace, R. (2003). Help seeking and help design in interactive learning environments. Review of educational research, 73(3), 277-320.

(Continued)

*Primary Examiner* — Thomas J Hong (74) *Attorney, Agent, or Firm* — Shook, Hardy & Bacon L.L.P.

(57) ABSTRACT

Techniques are described for jointly modeling knowledge tracing and hint-taking propensity. During a read phase, a co-learning model accepts as inputs an identification of a question and the current knowledge state for a learner, and the model predicts probabilities that the learner will answer the question correctly and that the learner will use a learning aid (e.g., accept a hint). The predictions are used to personalize an e-learning plan, for example, to provide a personalized assessment. By using these predictions to personalize a learner's experience, for example, by offering hints at optimal times, the co-learning system increases efficiencies in learning and improves learning outcomes. Once a learner has interacted with a question, the interaction is encoded and provided to the co-learning model to update the learner's knowledge state during an update phase.

20 Claims, 6 Drawing Sheets

(56) References Cited

OTHER PUBLICATIONS

Aleven, V., & Koedinger, K. R. (Jun. 2000). Limitations of student control: Do students know when they need help?. In International Conference on Intelligent Tutoring Systems (pp. 292-303). Springer, Berlin, Heidelberg.

Carlson, J. E., & von Davier, M. (2013). Item response theory (ETS R&D Scientific and Policy Contribution Series ETS SPC-13-05). Princeton, NJ: Educational Testing Service. 79 pages.

Castro, F. E. V., Adjei, S., Colombo, T., & Heffernan, N. (2015). Building Models to Predict Hint-or-Attempt Actions of Students. In Proceedings of the 8th International Conference on Educational Data Mining (pp. 476-479). International Educational Data Mining Society.

Caruana, R. (1998). Multitask learning. In Learning to learn (pp. 95-133). Springer, Boston, MA.

Corbett, A. (Jul. 2001). Cognitive computer tutors: Solving the two-sigma problem. In International Conference on User Modeling (pp. 137-147). Springer, Berlin, Heidelberg.

Corbett, A. T., & Anderson, J. R. (1994). Knowledge tracing: Modeling the acquisition of procedural knowledge. User modeling and user-adapted interaction, 4(4), 253-278.

Duong, H., Zhu, L., Wang, Y., & Heffernan, N. T. (Jul. 2013). A prediction model that uses the sequence of attempts and hints to better predict knowledge: "Better to attempt the problem first, rather than ask for a hint". In EDM (pp. 316-317).

Khajah, M., Lindsey, R. V., & Mozer, M. C. (2016). How deep is knowledge tracing?. arXiv preprint arXiv:1604.02416.

Liu, X., Gao, J., He, X., Deng, L., Duh, K., & Wang, Y. Y. (2015). Representation learning using multi-task deep neural networks for semantic classification and information retrieval. 10 pages.

Mathews, M., & Mitrović, T. (Jun. 2008). How does students' help-seeking behaviour affect learning?. In International Conference on Intelligent Tutoring Systems (pp. 363-372). Springer, Berlin, Heidelberg.

Miller, A., Fisch, A., Dodge, J., Karimi, A. H., Bordes, A., & Weston, J. (2016). Key-value memory networks for directly reading documents. arXiv preprint arXiv:1606.03126.

Misra, I., Shrivastava, A., Gupta, A., & Hebert, M. (2016). Cross-stitch networks for multi-task learning. In Proceedings of the IEEE Conference on Computer Vision and Pattern Recognition (pp. 3994-4003).

Piech, C., Bassen, J., Huang, J., Ganguli, S., Sahami, M., Guibas, L. J., & Sohl-Dickstein, J. (2015). Deep knowledge tracing. In Advances in Neural Information Processing Systems (pp. 505-513).

Wilson, K. H., Karklin, Y., Han, B., & Ekanadham, C. (2016). Back to the basics: Bayesian extensions of IRT outperform neural networks for proficiency estimation. arXiv preprint arXiv:1604.02336.

Zhang, J., Shi, X., King, I., & Yeung, D. Y. (Apr. 2017). Dynamic key-value memory networks for knowledge tracing. In Proceedings of the 26th International Conference on World Wide Web (pp. 765-774). International World Wide Web Conferences Steering Committee.

Zhou, J., Liu, J., Narayan, V. A., & Ye, J. (Aug. 2012). Modeling disease progression via fused sparse group lasso. In Proceedings of the 18th ACM SIGKDD international conference on Knowledge discovery and data mining (pp. 1095-1103). ACM.

\* cited by examiner

PERSONALIZED E-LEARNING USING A DEEP-LEARNING-BASED KNOWLEDGE TRACING AND HINT-TAKING PROPENSITY MODEL

BACKGROUND

Advances in e-learning have ushered in profound changes in knowledge creation and sharing by bringing personalized learning experiences to a user device. When a learner uses an e-learning system, the learner periodically takes assessments such as quizzes or assignments to gauge progress and expertise. A personalized e-learning plan identifies gaps in understanding of a concept and uses learning aids such as hints to fill these gaps.

One of the main components used to build a personalized learning experience is a knowledge tracing model. Generally, a knowledge tracing model tracks and estimates a learner's state of knowledge over time. A knowledge tracing model can be used to decide what questions to ask next. Further, a knowledge tracing model can be used to predict the learner's performance in future assessments.

Various approaches to knowledge tracing have been previously proposed. For example, item response theory models the probability that a learner will answer a question correctly as a function of the learner's skill level and question difficulty. Bayesian knowledge tracing uses the sequence of a learner's interactions to model the learner's skill in each concept separately, and uses the estimated skill levels to determine whether to repeat concepts, switch to a new concept, or skip a concept altogether. Recently, deep-learning based approaches have been employed to model a learner's skill level. However, while these approaches predict a learner's skill level, none of these approaches predict the probability that a learner will use a hint.

One approach has been proposed for predicting whether a learner will take a hint or attempt the next question, using a technique called the tabling method. The tabling method involves identifying a sequence of n most recent learner interactions, and counting the number of times the sequence appears in a training set comprising historical interactions of other learners. For example, to make a prediction for a learner who has taken two hints in a row followed by an attempt, the tabling method finds other learners with the same interaction sequence in the training set, and uses the next-interaction probability for those learners as the predicted value for the current learner. More specifically, the tabling method determines the probability that a particular learner will take a hint by taking the number of times other learners with the same action sequence took a hint on the next question, and dividing by the total number of these learners in the training dataset. However, the tabling technique has various drawbacks. For example, the tabling technique determines a hint-taking probability for a particular learner based on the aggregate behaviors of other learners. Utilizing the aggregate behaviors of other learners fails to account for the particular learner's understanding. Similarly, this technique models hint taking propensity as a function of a binary sequence reflecting whether or not the particular learner utilized a hint. Such a binary sequence, however, does not account for the substance of a particular question (e.g., difficulty, category, topic, etc.). Finally, the tabling technique does not consider the complete sequence of a learner's prior interactions. As such, the tabling technique performs poorly.

SUMMARY

Embodiments of the present invention are directed to a co-learning model that jointly models knowledge tracing and hint (or other learning aid) taking propensity. During a read phase, the co-learning model accepts as inputs an identification of a question and the current knowledge state for a learner. The model is trained to predict probabilities that the learner will answer the question correctly and that the learner will use a learning aid (e.g., accept a hint).

These probabilities can be used to personalize the learner's e-learning plan. For example, a decision can be made whether or not to present an option to use a learning aid during a question based on one or more of the probabilities. In one implementation, a hint may be withheld based on a determination that the probability that the learner will answer correctly exceeds a predetermined threshold. By withholding such a hint (or other learning aid) during an assessment, an e-learning application can force the learner to attempt a response, facilitating a faster path towards proficiency. Additionally and/or alternatively, the probability that the learner will accept a learning aid can be used to determine whether or not to present an option to use the learning aid. Similarly, one or both of the predictions can be used to determine when to move on to the next question type, what the next question type should be, when to remove particular questions from a learning plan, and the like.

Once a learner has interacted with a question (e.g., attempted to answer the question or selected an option to use the learning aid), the interaction is encoded and provided to the co-learning model to update the learner's knowledge state. As such, during an update phase, the co-learning model accepts an encoded interaction identifying a question, a learner's response, and an indication of whether the learner used the learning aid. The co-learning model is trained to update the learner's knowledge state based on the encoded interaction.

As such, techniques described herein utilize hint (or other learning aid) taking behavior to improve prediction accuracy for whether a learner will answer a question correctly. Moreover, the disclosed techniques provide new functionality by modeling hint (or other learning aid) taking propensity. By using these predictions to personalize a learner's experience, for example, by offering hints at optimal times, the co-learning system increases efficiencies in learning and improves learning outcomes.

BRIEF DESCRIPTION OF THE DRAWINGS

The present invention is described in detail below with reference to the attached drawing figures, wherein.

DETAILED DESCRIPTION

Overview

One common learning aid in many interactive e-learning systems is the option to take a hint during an assessment. Recent studies, however, have shown that learners tend to use hints inappropriately. More specifically, hints are often used unnecessarily or not used at all. For example, instead of spending time attempting to solve a difficult question, many learners opt for a hint right away. In another example, some learners may not utilize hints at all. As a general matter, more learners tend to take hints on difficult questions. However, hint takers tend to spend less time on a question than learners who attempt the question, irrespective of whether the question is correctly or incorrectly answered.

Conventional e-learning techniques that allow this type of hint usage produce inefficiencies in learning. For example, research has shown that learners who attempt a question tend to have a higher probability of achieving proficiency in the subject. Furthermore, learners who use hints very frequently tend to have the lowest learning rates. As such, conventional techniques which offer hints indiscriminately or without requiring a user to attempt a question can lead to poor learning outcomes. As such, there is an unmet need for personalized e-learning that offers hints or other learning aids at optimal times.

Conventional knowledge tracing models used to personalize learning plans do not model hint-taking behavior. Such conventional knowledge tracing models either tag a hint taken as an incorrect response or remove data points where hints were taken. Further, attempting to solve a question and taking a hint tend to result in different learning outcomes. Hence, conventional models that conflate an incorrect response with a hint taken produce deteriorated accuracy and performance. Moreover, when a learner takes a hint, the learner demonstrates the learner's knowledge state. Similarly, a higher propensity to take a hint may provide information about the likelihood of answering questions correctly. Hence, conventional models that throw away data points where hints were taken are actually discarding useful information.

Generally, conventional knowledge tracing models are parameterized based on a learner's skill level and question difficulty. For example, in such conventional knowledge tracing models, one might represent skill level by using one common parameter for all concepts, or by using a different parameter for each concept or a group of concepts clustered based on domain knowledge. A recent deep-learning-based knowledge tracing model has been proposed that utilizes past hint-taking behavior to predict whether a learner will answer a question correctly. This technique utilizes the tabling method, which utilizes a sequence of the learner's prior interactions of a predetermined length (e.g., the past four questions attempted), extracts a matching sequence from a training dataset comprising interactions of other learners, and uses the next-interaction probability that those learners correctly answered the next question as an input to the model, to compute the probability that the current learner will answer correctly. However, this technique suffers from various drawbacks. For example, there is a necessary tradeoff between using a larger history of responses (e.g., the past N responses) and training time. The larger the desired sequence, the more difficult the model is to train. Moreover, by limiting the length of the sequence available to the model to some predetermined number N, this technique is incapable of learning from a user's complete history of questions answered. Further, this model improperly considers hint usage to be an incorrect attempt, so a learner's actual knowledge state updates differently than this model reflects. Finally, this model does not predict hint-taking probability at all. As such, this model suffers from deteriorated accuracy and performance.

Accordingly, embodiments of the present invention are directed to a co-learning model that jointly models knowledge tracing and hint-taking propensity. To accomplish this joint modeling, the co-learning model can share network weights for separate predictions for the probability of answering a question correctly and the probability of taking a hint. In a read phase, the co-learning model accepts as inputs an identification of a question and the current knowledge state for a learner. The co-learning model outputs predicted probabilities that the learner will answer the question correctly and that the learner will accept a learning aid such as a hint. These probabilities can be used to personalize the learner's e-learning plan. For example, predetermined thresholds can be applied to determine when to move on to the next question type, what the next question type should be, when to remove particular questions from a learning plan, and/or whether to present a particular learning aide, such as an option to take a hint, an option to display a tutorial, an option to display a relevant section in text, and the like.

Once the learner has answered the question and/or opted for a hint or other learning aid, this interaction is fed back into the co-learning model to update the learner's knowledge state. In the update phase, the co-learning model accepts as an input a representation of the learner's last interaction and accesses the current knowledge state for the learner, and the co-learning model outputs an updated knowledge state for the learner. This process can continue, by iterating the read and update phases for each successive question during an assessment.

As such, implementations described herein provide a deep-learning-based knowledge tracing tool that jointly models the likelihood that a learner will answer a particular question correctly and the likelihood that the learner is likely to use a learning aid (e.g., take a hint). By using hint-taking behavior and/or the complete sequence of prior interactions with the co-learning system, the co-learning model improves prediction accuracy for whether a learner will answer a question accurately. Moreover, the co-learning model provides new functionality, by modeling hint (or other learning aid) taking propensity. Further, by using these predictions to personalize a learner's experience, for example, by offering hints at optimal times, the co-learning system increases efficiencies in learning and improves learning outcomes. For example, by withholding a hint when a learner is likely to get the answer correct, some learners will attempt the question. Moreover, for learners who have at least a moderate chance of answering correctly, but who have a high likelihood of taking a hint, withholding a hint can force the learner to attempt the question. Since research has shown that learners who attempt a question tend to have a higher probability of achieving proficiency in the subject, such techniques can facilitate faster paths to proficiency.

Having briefly described an overview of aspects of the present invention, various terms used throughout this description are provided. Although more details regarding various terms are provided throughout this description, general descriptions of some terms are included below to provider a clearer understanding of the ideas disclosed herein:

Knowledge tracing is defined as the process of modeling the knowledge state of a learner over time. This model can be used to predict the learner's performance on subsequent assessments. For example, given a learner's interactions with the co-learning system (e.g., historical responses), techniques disclosed herein model the probability of correctly answering a given question correctly in the future.

Hint-taking propensity—Assessments often include an option to take a hint (or use some other learning aid) to assist with a question. If a learner is stuck on a question, hints can help the learner to move forward in the assessment, for example, by providing a reference to relevant course material. However, indiscriminate use of hints can lead to suboptimal learning. Hence, techniques disclosed herein model the probability of taking a hint for a particular question ("hint-taking propensity") based on the learner's interactions with the co-learning system (e.g., historical responses). The hint-taking propensity can be used by the co-learning system to regulate hint usage during assessments.

Exemplary Co-Learning Environment

Figure 1:
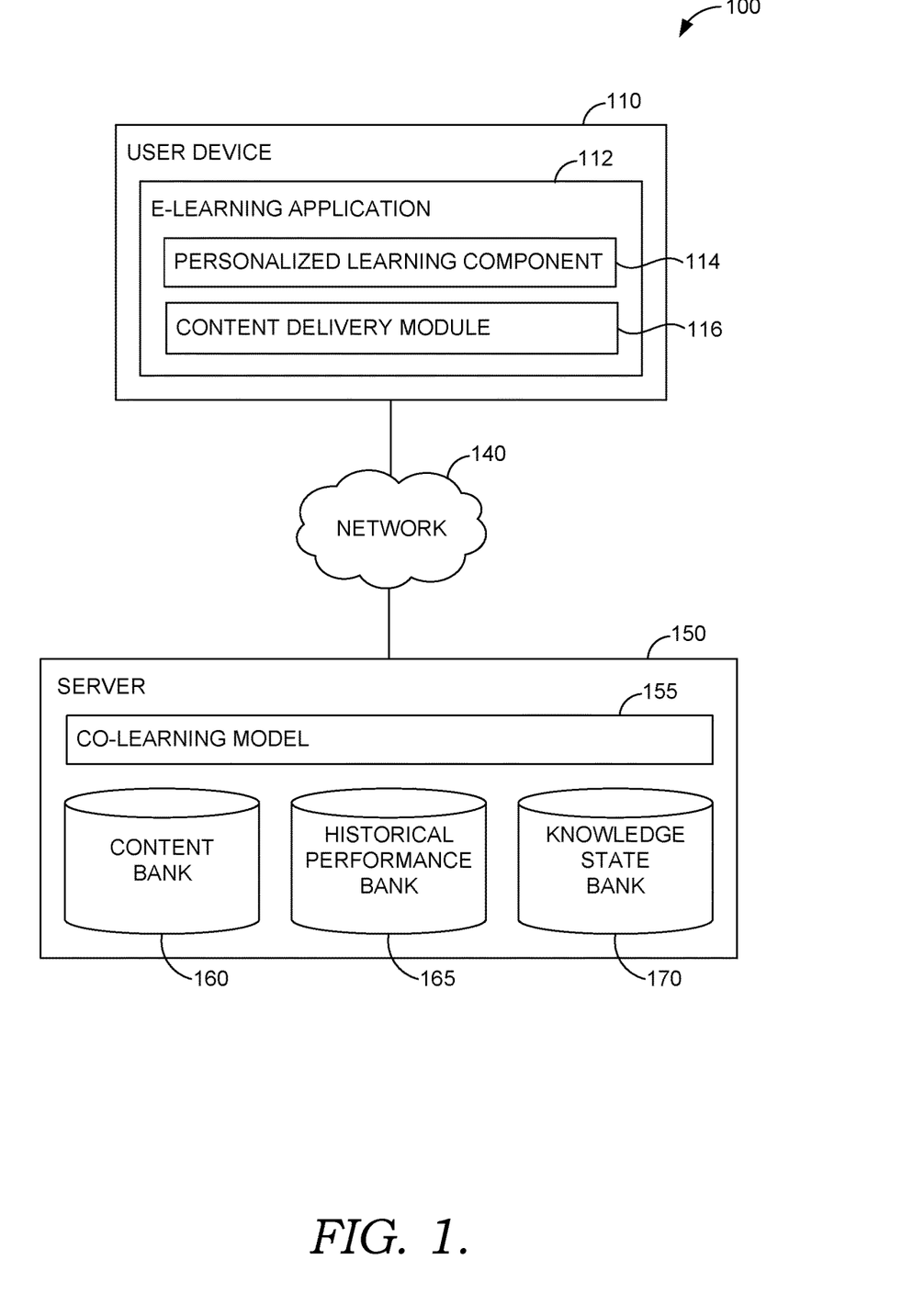
FIG. 1 is a block diagram of an exemplary computing system for personalized e-learning using knowledge tracing and hint-taking propensity, in accordance with embodiments of the present invention.

Referring now to FIG. 1, a block diagram of exemplary environment 100 suitable for use in implementing embodiments of the invention is shown. Generally, environment 100 is suitable for personalized e-learning, and, among other things, facilitates joint modeling of knowledge tracing and hint-taking propensity. Environment 100 includes user device 110 having e-learning application 112. Generally, e-learning application 112 provides a personalized e-learning environment that facilitates periodic assessments such as quizzes or assignments. User device 110 can be any kind of computing device capable of facilitating periodic assessments. For example, in an embodiment, user device 110 can be a computing device such as computing device 600, as described below with reference to FIG. 6. In embodiments, user device 110 can be a personal computer (PC), a laptop computer, a workstation, a mobile computing device, a PDA, a cell phone, or the like.

Environment 100 includes server 150 including co-learning model 155. In this embodiment, server 150 provides access to co-learning model 155 via network 140. Server 150 can be any kind of computing device capable of facilitating joint modeling of knowledge tracing and hint-taking propensity. For example, in an embodiment, server 150 can be a computing device such as computing device 600, as described below with reference to FIG. 6. In embodiments, server 150 can be a personal computer (PC), a laptop computer, a workstation, a mobile computing device, a PDA, a cell phone, or the like. The components of environment 100 may communicate with each other via a network 140, which may include, without limitation, one or more local area networks (LANs) and/or wide area networks (WANs). Such networking environments are commonplace in offices, enterprise-wide computer networks, intranets, and the Internet.

In the embodiment illustrated in FIG. 1, user device 110 includes e-learning application 112, and e-learning application 112 includes personalized learning component 114 and content delivery module 116. Although these components are depicted as part of user device 110, in some embodiments, some or all of these components, or some portion thereof, can be located remotely, such as on server 150. Similarly, in this embodiment, server 150 includes co-learning model 155, content bank 160, historical performance bank 165, and knowledge state bank 170. Although the components of server 150 are depicted as a part of (e.g., installed on or incorporated into) server 150, in some embodiments, some or all of these components, or some portion thereof, can be located elsewhere, such as on user device 110, in a distributed computing environment within which server 150 resides, and the like.

For example, co-learning model 155, personalized learning component 114, and/or content delivery module 116 may be incorporated into, integrated into, or otherwise accessible to an application, or an add-on or plug-in to an application, such as e-learning application 112. E-learning application 112 may generally be any application capable of facilitating personalized e-learning. E-learning application 112 may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). Although generally discussed herein as co-learning model 155, personalized learning component 114, and/or content delivery module 116 being associated with an application, in some cases, co-learning model 155, personalized learning component 114, and/or content delivery module 116, or some portion thereof, can be additionally or alternatively integrated into the operating system (e.g., as a service) or a server (e.g., a remote server).

Generally, e-learning application 112 facilitates periodic assessments such as quizzes or assignments in order to measure a particular student's proficiency and expertise over time. Moreover, e-learning application 112 can administer assessments in accordance with an e-learning plan, which can be personalized for a particular learner. As explained below, decisions can be made regarding which type of question to ask (e.g., category or subject), in what sequence to ask particular questions and/or question types, an optimal time to deliver content such as learning aids, and the like. In the embodiment illustrated in FIG. 1, e-learning application 112 includes personalized learning component 114 and content delivery module 116. Personalized learning component 114 generally determines when to move on to the next question type (e.g., category of question), what the next question type should be, and/or when to remove particular questions from a learning plan. Content delivery module 116 generally determines whether to present a particular learning aide, such as an option to take a hint, an option to display a tutorial, an option to display a relevant section in text, and the like. To facilitate these determinations, e-learning application 112 accesses co-learning model 155 via network 140. Generally, co-learning model 155 predicts a probability that a particular learner will answer a particular question correctly and a probability that the learner will use a learning aid (e.g., take a hint). E-learning application 112 can utilize these predictions to deliver a personalized e-learning plan.

Co-learning model 155 jointly models knowledge tracing and hint-taking propensity. As a general matter, the interactions of a learner until time T can be denoted by $X=\{x_1, x_2, x_3, \ldots, x_T\}$. Here, each interaction $x=1 \ldots T$ is an encoding that can represent an interaction tuple $\{q_t, r_t, h_t\}$ for a particular learner containing an identifier of a particular question attempted $q_t$, a binary indicator encoding the correctness of the learner's response $r_t$, and a binary indicator encoding hint usage $h_t$. For example, the hint usage variable can be positive only if a hint was taken directly instead of attempting the question first. Let $Q=\{q_t\}$ be a set of distinct questions. The interaction tuple can contain additional information collected such as time taken to attempt, type of question, concepts involved in the question, and so on. Generally, co-learning model 155 predicts the probability that the learner will correctly answer a question $q_t' \in Q$, i.e., $\text{Prob}(r_t=1|q_t', X)$. Moreover, co-learning model 155 predicts the probability that the learner will use a hint, i.e., $\text{Prob}(h_t=1|q_t', X)$. In some embodiments, co-learning model 155 performs each of these tasks using supervised learning and a machine learning model such as a binary classifier, a neural network, or the like. However, instead of building two separate models for these tasks, in some embodiments, co-learning model 155 jointly models both tasks within a deep-learning-based classification framework.

Generally, a neural network can be implemented to store, access, and update a knowledge state of a learner (e.g., in knowledge state bank 170 of FIG. 1) based on the learner's past interactions (e.g., stored in historical performance bank 165). This can be accomplished using a memory component which works like a key-value store. For example, each attempted question (e.g., stored in content bank 160) can be mapped to a set of concepts which are the keys in the memory component. The corresponding values are the learner's knowledge state in each of these concepts. Key-value pairs can be modeled using vectors instead of scalars for more representational flexibility. In this manner, the memory component can retrieve a learner's knowledge state for each question. The knowledge state can be compared with the difficulty level of the question and used to predict a probability of correctly answering the question. Moreover, the neural network can include a mechanism that updates the learner's knowledge state based on the learner's response to a particular question. Advantageously, all operations are implemented using differentiable operators like multiplication, addition, sigmoid function, etc., on matrices so that the network can be trained end-to-end using gradient descent optimization techniques.

Figure 2:
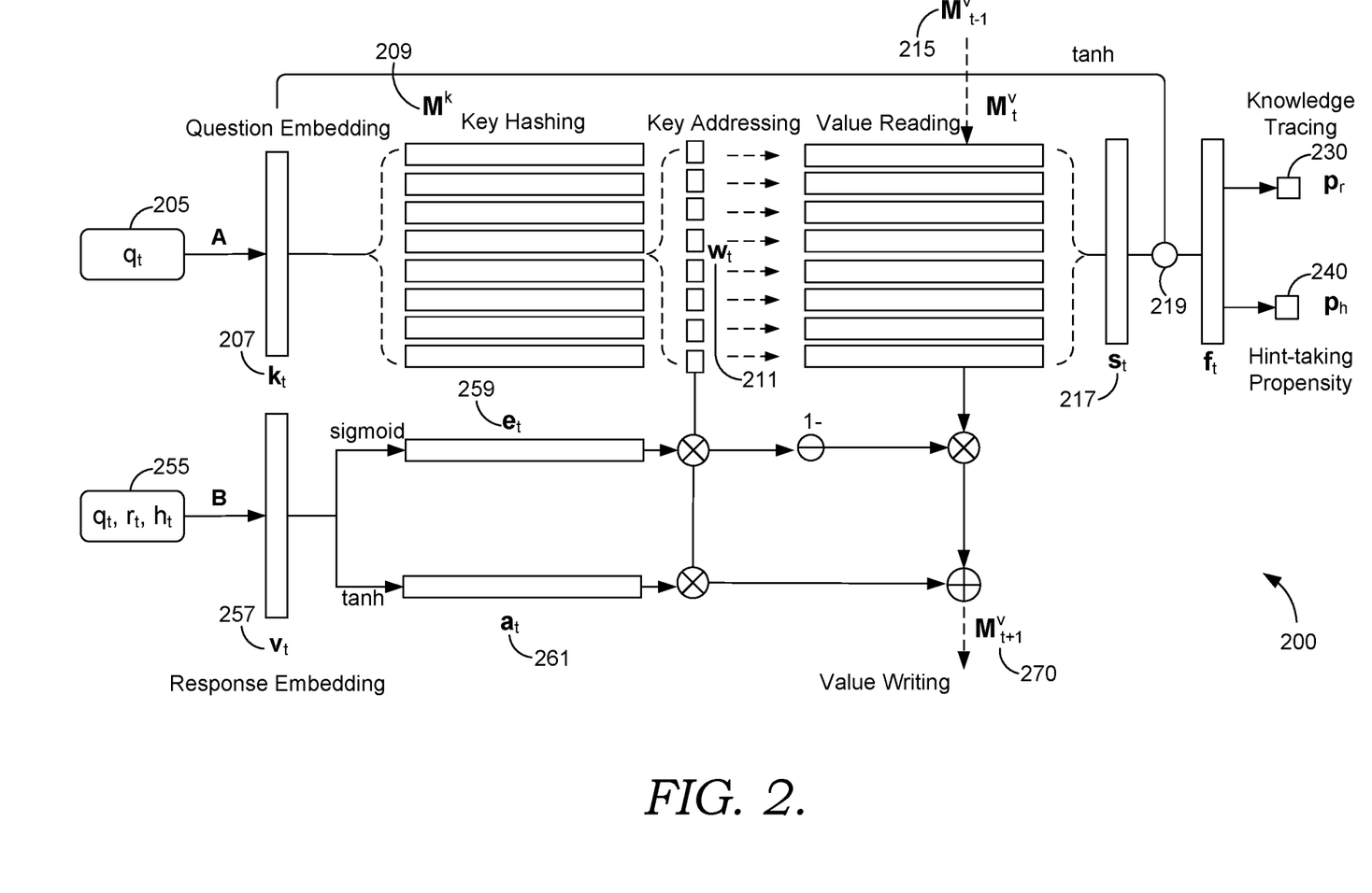
FIG. 2 is a block diagram of an exemplary co-learning model, in accordance with embodiments of the present invention.

FIG. 2 illustrates exemplary co-learning model 200 (which can correspond with co-learning model 155 of FIG. 1). Generally, co-learning model 200 operates in two phases: a read phase and an update phase. In the read phase, co-learning model 200 accepts two inputs: a representation of current question 205 ($q_t$) and a representation of a learner's most recent knowledge state 215 ($M_{t-1}^v$). The outputs of the read phase are predictions of probability 230 that a learner will correctly attempt the question ($p_r$) and probability 240 that the learner will take use a learning aid such as a hint ($p_h$). These probabilities can be provided to e-learning application 112 (e.g., personalized learning component 114 and/or content delivery module 116) to facilitate decisions regarding which type of question to ask (e.g., category or subject), in what sequence to ask particular questions and/or question types, an optimal time to deliver content such as a learning aid (e.g., a hint), and the like.

Once a learner attempts a question (or takes a hint), the user's response can be encoded and provided to co-learning model 200 to update the learner's knowledge state. For example, three outcomes for a particular interaction with a question (correct response, incorrect response, hint taken) can be encoded in various ways, as will be understood by those of ordinary skill in the art. In some embodiments, one-hot encoding is used to encode ($q_t$, $r_t$, $h_t$) into a vector based on a set of distinct questions Q. In some embodiments, the first |Q| dimensions of the encoding are a one-hot vector representing a correct attempt on the question. For example, in the case of a correct attempt, the vector can have 1 at the index for the question and 0 everywhere else. Similarly, the next |Q| dimensions can encode an incorrect attempt. In some embodiments, hint-taking (or use of some other learning aid) may be similarly one-hot encoded. However, the accuracy of co-learning model 200 may be improved by encoding hint-taking as a binary value representing hint-taking across different questions. This indicates that it is important to know how many times a learner has taken a hint, but the identity of the questions on which the hints are taken does not impact the two prediction tasks. As such, a particular interaction is advantageously encoded into a vector of length 2|Q|+1. Table 1 provides an example of such input encoding where there are a total of two questions, Q1 and Q2.

TABLE 1

| Interaction | Encoding |
|---|---|
| Q2 - Correct Response | (0, 1, 0, 0, 0) |
| Q2 - Incorrect Response | (0, 0, 0, 1, 0) |
| Q2 - Hint Taken | (0, 0, 0, 0, 1) |
| Q1 - Hint Taken | (0, 0, 0, 0, 1) |

In the update phase, co-learning model 200 accepts as an input a representation of a learner's most recent interaction 255 ($q_t$, $r_t$, $h_t$). Co-learning model accesses and updates the learner's knowledge state and outputs updated knowledge state 270 ($M_{t+1}^v$). The read phase and update phase are explained in more detail below.

In some embodiments, co-learning model 200 utilizes a key-value memory network to match concepts in representations of questions and knowledge states, and to retrieve and update a learner's knowledge state. Generally, key-value memory networks have a memory component which can be an array of pairs of memory slots, where each slot is a real-valued vector. Given a particular query, the relevant information can be fetched from the slots using an attention-based mechanism, depending on which slots are relevant for that query. In the embodiment illustrated in FIG. 2, the attention-based mechanism includes three components: key hashing, key addressing, and value reading.

In one implementation, the key portion of key-value pairs can hold static information representing various hidden concepts using vectors. For example, key vectors 209 $M^k(1) \ldots M^k(n)$) can represent a different question type or concept. Given the $t^{th}$ question answered by a learner, the relevance of each concept $c_i$ to that question can be extracted using an attention mechanism. For example, a particular question (e.g., question 205 $q_t$) can be first converted into question embedding vector 207 $k_t$ using a question embedding matrix A to extract vector $k_t$ for question $q_t$ 205:

$$k_t = A^* q_t \quad (1)$$

In this embodiment, key hashing is applied by multiplying vector $k_t$ by $M^k$ to arrive at a representation for the particular question. Generally, $M^k(i)$ denotes the key vector of the $i^{th}$ concept. Co-learning model 200 can use key addressing by determining appropriate weights 211 to point to each concept $c_i$ in $q_t$ as:

$$w_t(i) = \text{Softmax}(k_t^T * M^k(i)) \quad (2)$$

Generally, weights 211 $w_t(i)$ point to the memory locations for the concepts that a particular question includes. Here, $\text{Softmax}(x_i) = e^{x_i}/\Sigma_j e^{x_j}$.

In order to read the relevant portion of a learner's knowledge state, the learner's skill in that question is calculated as the weighted sum of the knowledge in each of the concepts, read from value matrix $M_t^v$. Generally, value matrix $M_t^v$ represents a learner's understanding or knowledge base at a given time t. By retrieving the relevant knowledge state and multiplying it by the weighted representation of the question, the student's skill 217 $s_t$ in the question $q_t$ is returned as:

$$s_t = \Sigma_{i=1}^n M_t^v(i) * w_t(i) \quad (3)$$

Skill 217 contains different dimensions representing different categories of knowledge. Generally, skill 217 is used to make predictions about the learner's likelihood of answering correctly and taking a hint (or other learning aid).

In the embodiment illustrated in FIG. 2, probabilities for the learner's likelihood of answering correctly and taking a hint (or other learning aid) are calculated by applying separate linear transformations followed by sigmoid activations. More specifically, skill 217 $s_t$ can be concatenated with question embedding vector 207 $k_t$, and a single layer feedforward network (or other suitable network) can be applied at block 219 to arrive at a feature vector $F_t$:

$$F_t = \text{Tan } h(W_f^{T*}(s_t \| k_t) + b_f) \quad (4)$$

Here, $W_f^T$ is a weighted linear transformation, $b_f$ is bias, and II is the concatenation operator. When the learner attempts a response or opts for a learning aid (e.g., a hint), the interaction can be used to update the weights of the feedforward network. In the embodiment illustrated in FIG. 2, probability 230 that a learner will correctly attempt the question ($p_r$) and probability 240 that the learner will use a learning aid such as a hint ($p_h$) can be determined by applying separate linear transformations and separate sigmoid activations. As such, the probabilities can be given by:

$$p_r^{pred} = \text{Sigmoid}(W_r^{T*}f_t + b_p^r) \quad (5)$$

$$p_h^{pred} = \text{Sigmoid}(W_h^{T*}f_t + b_p^h) \quad (6)$$

where $W_r^T$ and $W_h^T$ are linear transformations, and $b_p$ and $b_p^h$ are bias vectors.

Once a learner responds to a question (e.g., attempts and answer, opts for a learning aid, etc.), during the update phase, co-learning model 200 updates the learner's knowledge state and the weights of the feedforward network. Generally, the learner's most recent interaction 255 $x_t = (q_t, r_t, h_t)$ is encoded, and provided as an input. This encoding can be converted into response embedding 257 $v_t$ using response embedding matrix B:

$$v_t = B^* x_t \quad (7)$$

In order to update the learner's knowledge state, memory can be erased before new information is added. Erase vector $e_t$ 259 can be calculated as:

$$e_t = \text{Sigmoid}(E^T v_t + b_e) \quad (8)$$

where $E^T$ is a linear transformation matrix, $b_e$ is the bias, and Sigmoid($x_i$)=1/(1+$e^{x_i}$). Meanwhile, addition vector $a_t$ 261 can be calculated as:

$$a_t = \text{Tan } h(D^T v_t + b_a) \quad (9)$$

where $D^T$ is a linear transformation matrix, $b_a$ is the bias, and Tan $h(x_i) = (e^{x_i} - e^{-x_i})/(e^{x_i} + e^{-x_i})$.

In order to update the knowledge state, co-learning model 200 identifies the memory locations where values should be updated based on weights 211 $w_t(i)$ which were determined during the read phase. In this manner, updates to each concept $c_i$'s value vectors are also weighted based on weights 211 $w_t(i)$ calculated in equation (2). Weights 211 $w_t(i)$ can be modified by applying erase vector $e_t$ 259 (and subtracting one) and by applying addition vector $a_t$ 261 to update the memory locations. Accordingly, after the $t^{th}$ response, co-learning model 200 updates value matrix $M_t^v$ as:

$$M_t^v(i) = M_{t-1}^v(i) \odot [1 - w_t(i)e_t] + w_t(i)a_t \quad (10)$$

In this manner, co-learning model 200 can add and forget learner knowledge in concepts as more and more assessments are attempted.

To train co-learning model 200, binary cross-entropy between actual and predicted outputs can be used for a loss function. The sum of these loss values can be taken as an overall loss function for co-learning model 200 and back-propagated. This is in contrast to conventional techniques, which only consider the loss from the knowledge tracing task for training. Advantageously, when a learner opts for a learning aid (e.g., takes a hint), only the loss of the hint-taking prediction is propagated. In other words, the loss for the knowledge tracing task is 0 in this case. Generally, the weights for co-learning model 200 (except the final output layer) are shared between the two tasks, knowledge tracing and hint-taking propensity. This co-learning serves to regularize learning network weights because, by using the same set of weights for two tasks, co-learning model 200 has to maximize two objectives. Co-learning also facilitates sharing knowledge across tasks by sharing network weights. Experimental results demonstrate a network trained using co-learning outperforms conventional models for individual tasks.

Returning now to FIG. 1, predictions from co-learning model 155/200 can facilitate personalized e-learning using a personalized e-learning plan that defines what questions to ask and/or whether to present an option to use a learning aid such as a hint. For example, personalized learning component 114 can utilize the predictions of probabilities that a learner is likely to answer correctly and/or that a learner is likely to use a learning aid (e.g., take a hint) to determine when to move on to the next question type (e.g., category of question), what the next question type should be, and/or when to remove particular questions from a learning plan. For example, personalized learning component 114 can determine an amount of practice required for a question type, for example, moving to the next question type when the probability of answering the current question is above a threshold. As such, personalized learning component 114 can decide when to stop asking questions from a particular question type based on data, unlike conventional rule-based approaches.

Similarly, personalized learning component 114 can decide when to remove particular questions from a learning plan. Generally, a learning plan can contain defined prerequisites for mastering a concept, and a sequence in which to learn them. Given such a plan, question types that are already mastered (e.g., determined using co-learning model 155) can be progressively pruned from the learning plan, thus reducing redundancy in assessments and improving efficiency. Additionally and/or alternatively, personalized learning component 114 can determine which new concept should be presented next based on knowledge of question types that are already mastered and/or associated estimates of a proficiency level of a learner (e.g., the learner's knowledge state determined using co-learning model 155). Other variations of such artificial-intelligence-based adaptive approaches to personalize a learning plan will be understood by those of ordinary skill in the art.

Similarly, content delivery module 116 can utilize the predictions of probabilities that a learner is likely to answer correctly and/or that a learner is likely to use a learning aid (e.g., take a hint) to determine whether to present a particular learning aide (e.g., during a questions), such as an option to take a hint, an option to display a tutorial, an option or link to display a relevant section in text and/or a video, and the like. As such, content delivery module 116 can learn how to deliver content based on the learning style and current state of knowledge of a particular learner. By way of nonlimiting example, content delivery module 116 may not show a hint when the probability that a learner will answer correctly is above a predetermined threshold and the probability of taking a hint is high. In this situation, the learner may not need a hint, so withholding the hint can force the learner to attempt the question, facilitating a faster path towards proficiency. The order of magnitude for any such threshold can be a domain-specific choice. By way of nonlimiting example, the predetermined threshold can be 75% for the probability of answering correctly and 75% for the probability of hint-taking. Although in this example, the thresholds are the same, this need not be the case. Other variations for such artificial-intelligence-based content delivery will be understood by those of ordinary skill in the art.

Exemplary Flow Diagrams

Figure 3:
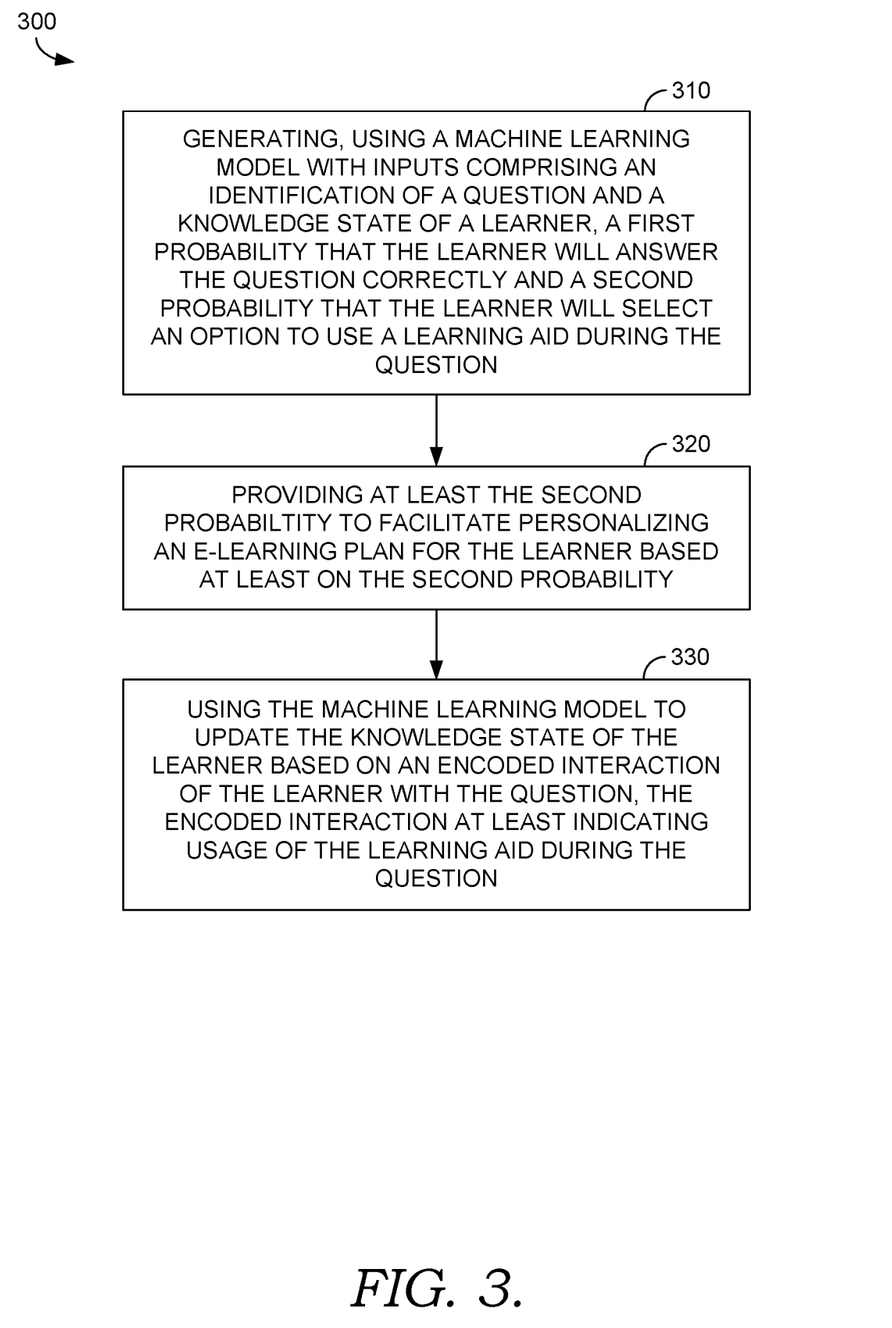
FIG. 3 is a flow diagram showing a first method for personalized e-learning, in accordance with embodiments of the present invention.
Figure 4:
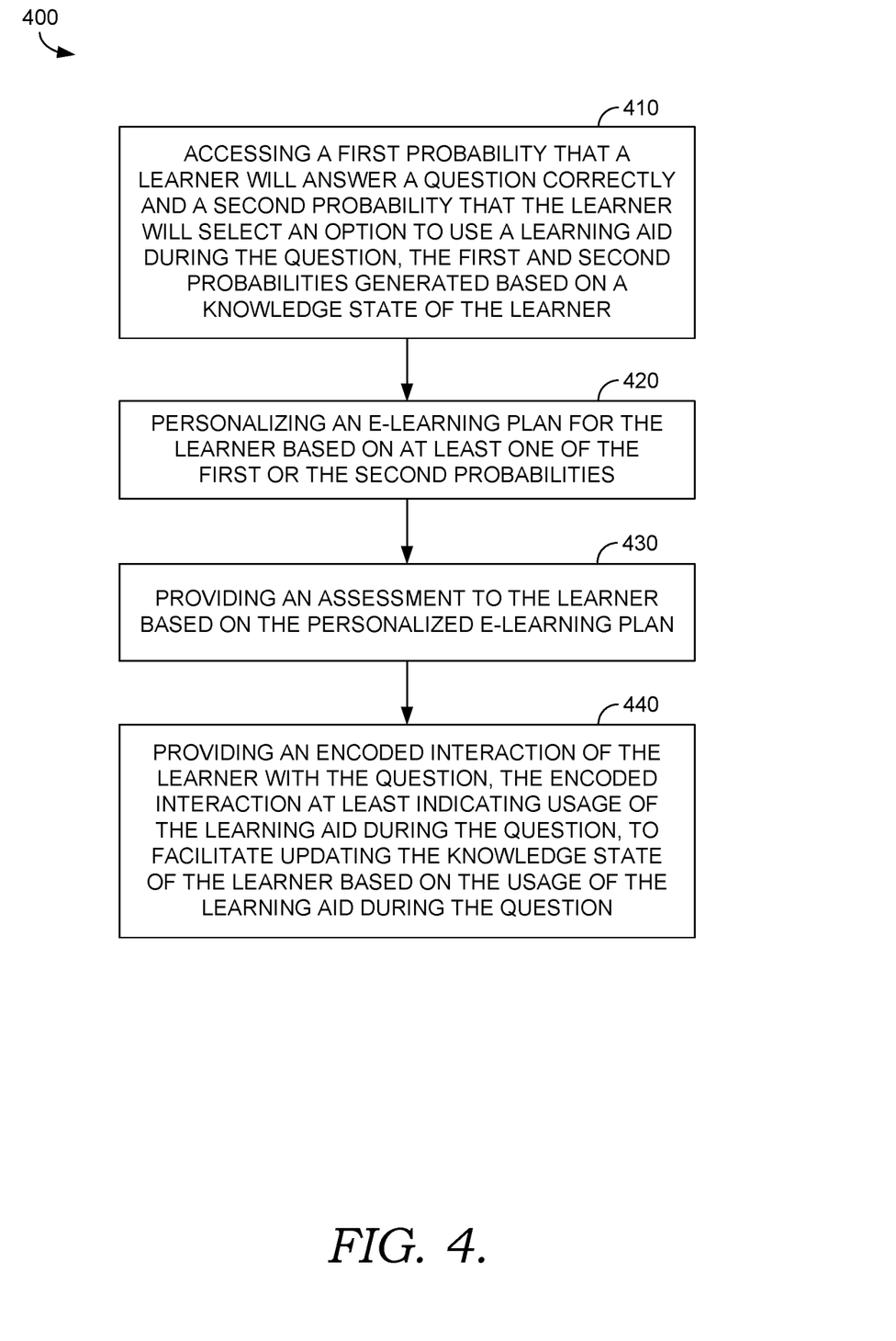
FIG. 4 is a flow diagram showing a second method for personalized e-learning, in accordance with embodiments of the present invention.

With reference now to FIGS. 3-4, flow diagrams are provided illustrating methods for personalize e-learning. Each block of the methods 300 and 400 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 3, FIG. 3 illustrates method 300 for personalized e-learning, in accordance with embodiments described herein. Initially at block 310, a machine learning model, with inputs comprising an identification of a question and a knowledge state of a learner, is used to generate a first probability that the learner will answer the question correctly and a second probability that the learner will select an option to use a learning aid during the question. At block 320, at least the second probability is provided to facilitate personalizing an e-learning plan for the learner based at least on the second probability. At block 330, the machine learning model is used to update the knowledge state of the learner based on an encoded interaction of the learner with the question. The encoded interaction at least indicates usage of the learning aid during the question.

Turning now to FIG. 4, FIG. 4 illustrates method 400 for personalized e-learning, in accordance with embodiments described herein. Initially at block 410, a first probability that a learner will answer a question correctly and a second probability that the learner will select an option to use a learning aid during the question are accessed. The first and second probabilities are based on a knowledge state of the learner. At block 420, an e-learning plan for the learner is personalized based on at least one of the first or the second probabilities. At block 430, an assessment is provided to the learner based on the personalized e-learning plan. At block 440, an encoded interaction of the learner with the question is provided to facilitate updating the knowledge state of the learner based the usage of the learning aid during the question. The encoded interaction at least indicates usage of the learning aid during the question.

Exemplary Computing Environment

Figure 5:
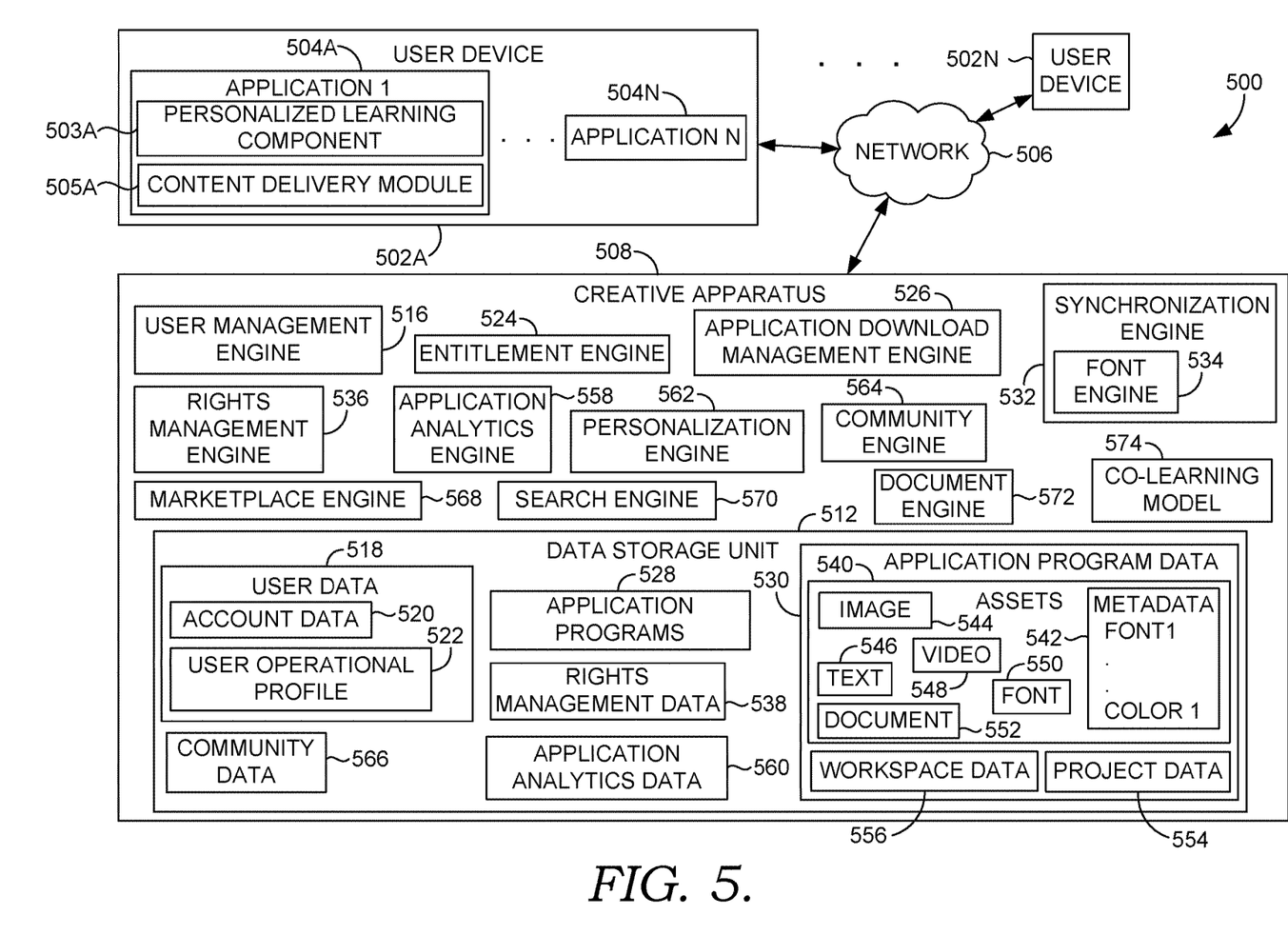
FIG. 5 is a block diagram of an exemplary computing environment in which embodiments of the invention may be employed.

FIG. 5 is a diagram of environment 500 in which one or more embodiments of the present disclosure can be practiced. Environment 500 includes one or more user devices, such as user devices 502A-502N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 508. It is to be appreciated that following description may generally refer to user device 502A as an example and any other user device can be used.

A user of the user device can utilize various products, applications, or services supported by creative apparatus 508 via network 506. User devices 502A-502N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 508.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 502A-502N can be connected to creative apparatus 508 via network 506. Examples of network 506 include, but are not limited to, internet, local area network (LAN), wireless area network, wired area network, wide area network, and the like.

Creative apparatus 508 includes one or more engines for providing one or more digital experiences to the user. Creative apparatus 508 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 508 also includes data storage unit 512. Data storage unit 512 can be implemented as one or more databases or one or more data servers. Data storage unit 512 includes data that is used by the engines of creative apparatus 508.

A user of user device 502A visits a webpage or an application store to explore applications supported by creative apparatus 508. Creative apparatus 508 provides the applications as a software as a service (SaaS), or as a standalone application that can be installed on user device 502A, or as a combination. The user can create an account with creative apparatus 508 by providing user details and also by creating login details. Alternatively, creative apparatus 508 can automatically create login details for the user in response to receipt of the user details. In some embodiments, the user is also prompted to install an application manager. The application manager enables the user to manage installation of various applications supported by creative apparatus 508 and also to manage other functionalities, such as updates, subscription account and the like, associated with the applications. User details are received by user management engine 516 and stored as user data 518 in data storage unit 512. In some embodiments, user data 518 further includes account data 520 under which the user details are stored.

The user can either opt for a trial account or can make payment based on type of account or subscription chosen by the user. Alternatively, the payment can be based on product or number of products chosen by the user. Based on payment details of the user, user operational profile 522 is generated by entitlement engine 524. User operational profile 522 is stored in data storage unit 512 and indicates entitlement of the user to various products or services. User operational profile 522 also indicates type of user, i.e. free, trial, student, discounted, or paid.

In some embodiment, user management engine 516 and entitlement engine 524 can be one single engine performing the functionalities of both the engines.

The user can then install various applications supported by creative apparatus 508 via an application download management engine 526. Application installers or application programs 528 present in data storage unit 512 are fetched by application download management engine 526 and made available to the user directly or via the application manager. In one embodiment, an indication of all application programs 528 are fetched and provided to the user via an interface of the application manager. In another embodiment, an indication of application programs 528 for which the user is eligible based on user's operational profile are displayed to the user. The user then selects application programs 528 or the applications that the user wants to download. Application programs 528 are then downloaded on user device 502A by the application manager via the application download management engine 526. Corresponding data regarding the download is also updated in user operational profile 522. Application program 528 is an example of the digital tool. Application download management engine 526 also manages the process of providing updates to user device 502A.

Upon download, installation and launching of an application program, in one embodiment, the user is asked to provide the login details. A check is again made by user management engine 516 and entitlement engine 524 to ensure that the user is entitled to use the application program. In another embodiment, direct access is provided to the application program as the user is already logged into the application manager.

The user uses one or more application programs 504A-504N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 530 in data storage unit 512 by synchronization engine 532. Alternatively or additionally, such data can be stored at the user device, such as user device 502A.

Application program data 530 includes one or more assets 540. Assets 540 can be a shared asset which the user wants to share with other users or which the user wants to offer on a marketplace. Assets 540 can also be shared across multiple application programs 528. Each asset includes metadata 542. Examples of metadata 542 include, but are not limited to, font, color, size, shape, coordinate, a combination of any of these, and the like. In addition, in one embodiment, each asset also includes a file. Examples of the file include, but are not limited to, image 544, text 546, video 548, font 550, document 552, a combination of any of these, and the like. In another embodiment, an asset only includes metadata 542.

Application program data 530 also include project data 554 and workspace data 556. In one embodiment, project data 554 includes assets 540. In another embodiment, assets 540 are standalone assets. Similarly, workspace data 556 can be part of project data 554 in one embodiment while it may be standalone data in other embodiment.

A user can operate one or more user device to access data. In this regard, application program data 530 is accessible by a user from any device, including a device which was not used to create assets 540. This is achieved by synchronization engine 532 that stores application program data 530 in data storage unit 512 and enables application program data 530 to be available for access by the user or other users via any device. Before accessing application program data 530 by the user from any other device or by any other user, the user or the other user may need to provide login details for authentication if not already logged in. In some cases, if the user or the other user are logged in, then a newly created asset or updates to application program data 530 are provided in real time. Rights management engine 536 is also called to determine whether the newly created asset or the updates can be provided to the other user or not. Workspace data 556 enables synchronization engine 532 to provide a same workspace configuration to the user on any other device or to the other user based on rights management data 538.

In various embodiments, various types of synchronization can be achieved. For example, the user can pick a font or a color from user device 502A using a first application program and can use the font or the color in a second application program on any other device. If the user shares the font or the color with other users, then the other users can also use the font or the color. Such synchronization generally happens in real time. Similarly, synchronization of any type of application program data 530 can be performed.

In some embodiments, user interaction with applications 504 is tracked by application analytics engine 558 and stored as application analytics data 560. Application analytics data 560 includes, for example, usage of a tool, usage of a feature, usage of a workflow, usage of assets 540, and the like. Application analytics data 560 can include the usage data on a per user basis and can also include the usage data on a per tool basis or per feature basis or per workflow basis or any other basis. Application analytics engine 558 embeds a piece of code in applications 504 that enables the application to collect the usage data and send it to application analytics engine 558. Application analytics engine 558 stores the usage data as application analytics data 560 and processes application analytics data 560 to draw meaningful output. For example, application analytics engine 558 can draw an output that the user uses "Tool 4" a maximum number of times. The output of application analytics engine 558 is used by personalization engine 562 to personalize a tool menu for the user to show "Tool 4" on top. Other types of personalization can also be performed based on application analytics data 560. In addition, personalization engine 562 can also use workspace data 556 or user data 518 including user preferences to personalize one or more application programs 528 for the user.

In some embodiments, application analytics data 560 includes data indicating status of a project of the user. For example, if the user was preparing an article in a digital publishing application and what was left was publishing the prepared article at the time the user quit the digital publishing application, then application analytics engine 558 tracks the state. Now when the user next opens the digital publishing application on another device, then the user is indicated and the state and options are provided to the user for publishing using the digital publishing application or any other application. In addition, while preparing the article, a recommendation can also be made by synchronization engine 532 to incorporate some of other assets saved by the user and relevant for the article. Such a recommendation can be generated using one or more engines, as described herein.

Creative apparatus 508 also includes community engine 564 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 540. Community engine 564 stores any data corresponding to the community, such as work shared on the community and comments or likes received for the work as community data 566. Community data 566 also includes notification data and is used for notifying other users by the community engine in case of any activity related to the work or new work being shared. Community engine 564 works in conjunction with synchronization engine 532 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 564 and synchronization engine 532. In collaborative workflows, a plurality of users is assigned different tasks related to the work.

Creative apparatus 508 also includes marketplace engine 568 for providing marketplace to one or more users. Marketplace engine 568 enables the user to offer an asset for selling or using. Marketplace engine 568 has access to assets 540 that the user wants to offer on the marketplace. Creative apparatus 508 also includes search engine 570 to enable searching of assets 540 in the marketplace. Search engine 570 is also a part of one or more application programs 528 to enable the user to perform search for assets 540 or any other type of application program data 530. Search engine 570 can perform a search for an asset using metadata 542 or the file.

Creative apparatus 508 also includes document engine 572 for providing various document related workflows, including electronic or digital signature workflows, to the user. Document engine 572 can store documents as assets 540 in data storage unit 512 or can maintain a separate document repository (not shown in FIG. 5).

In accordance with embodiments of the present invention, application programs 528 includes an e-learning application that facilitates personalized e-learning. In these embodiments, the e-learning application is provided to user device 502A (e.g., as application 504A) such that the e-learning application operates via the user device. In the embodiment illustrated in FIG. 5, the e-learning application includes personalized learning component 503A and content delivery module 505A (which may correspond with personalized learning component 114 and content delivery module 116 of FIG. 1). In another embodiment, personalized learning component 503A and/or content delivery module 505A can be provided as an add-on or plug-in to an application. Additionally and/or alternatively, personalized learning component 503A and/or content delivery module 505A, or some portion thereof, can execute on creative apparatus 508. Similarly, in the embodiment illustrated in FIG. 5, creative apparatus 508 includes co-learning model 574 (which may correspond with co-learning model 155 of FIG. 1). However, in some embodiments, co-learning model 574, or some portion thereof, can be located elsewhere, such as on user device 502A, or on some other component, such as a component of a distributed computing environment. These configurations are merely exemplary, and other variations for providing storyboarding software functionality are contemplated within the present disclosure.

It is to be appreciated that the engines and working of the engines are described as examples herein, and the engines can be used for performing any step in providing digital experience to the user.

Exemplary Operating Environment

Figure 6:
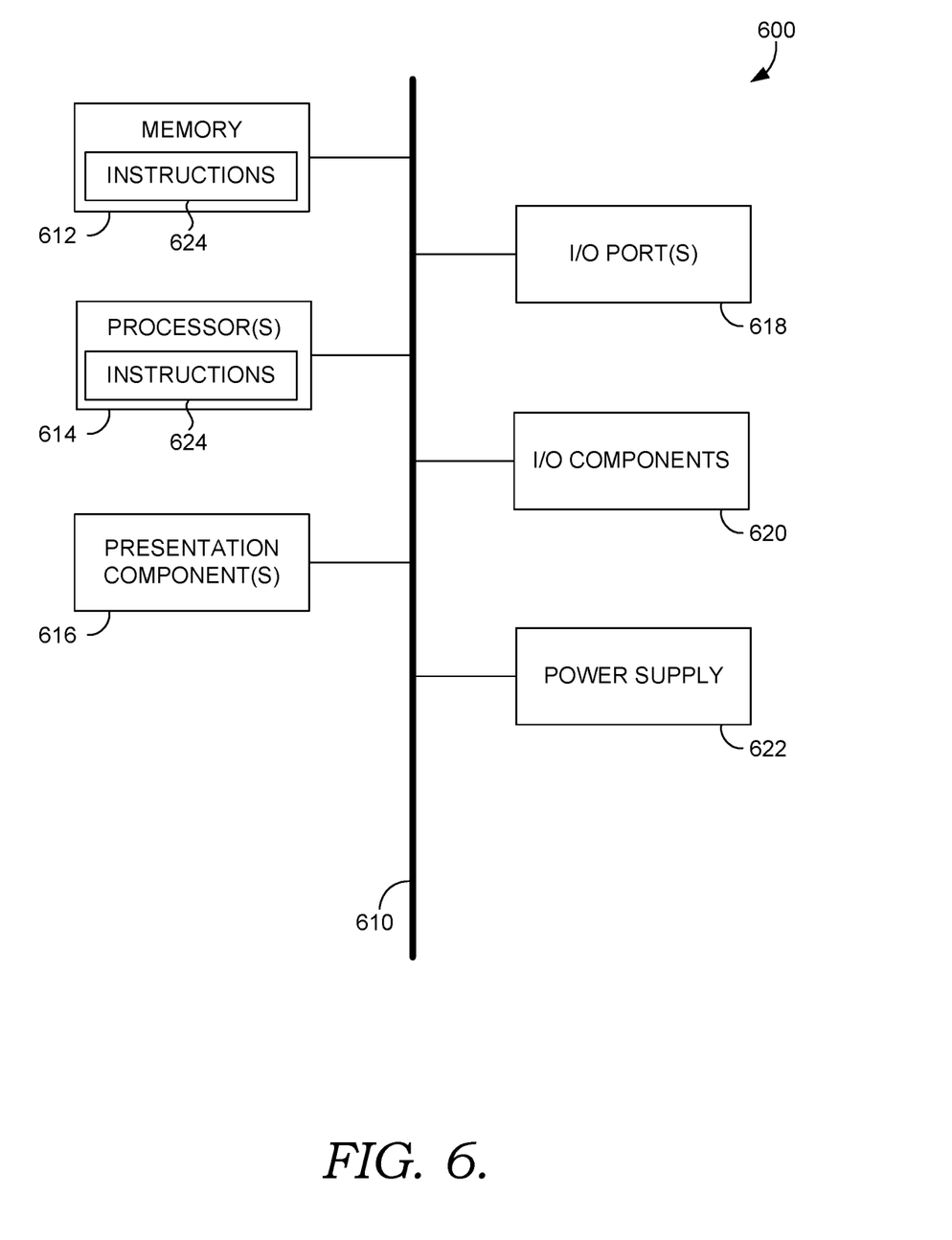
FIG. 6 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600.

Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support personalized e-learning using a co-learning model. The components described herein refer to integrated components of a personalized e-learning system. The integrated components refer to the hardware architecture and software framework that support functionality using the personalized e-learning system. The hardware architecture refers to physical components and interrelationships thereof and the software framework refers to software providing functionality that can be implemented with hardware embodied on a device.

The end-to-end software-based personalized e-learning system can operate within the personalized e-learning system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for personalized e-learning, the method comprising:
    generating, using a machine learning model with inputs comprising an identification of a question and a knowledge state of a learner, a first probability that the learner will answer the question correctly and a second probability that the learner will select an option to use a learning aid during the question, wherein the machine learning model is a co-learning model that jointly models the first probability that the learner will answer the question correctly and the second probability that the learner will select the option to use the learning aid during the question;
    providing at least the second probability to facilitate personalizing an e-learning plan for the learner based at least on the second probability; and
    using the machine learning model to update the knowledge state of the learner based on an encoded interaction of the learner with the question, the encoded interaction at least indicating usage of the learning aid during the question.

2. The method of claim 1, wherein the co-learning model jointly models the first probability and the second probability by sharing at least some network weights for separate tasks corresponding to the first and the second probabilities.

3. The method of claim 1, wherein the machine learning model is configured to update network weights based on the usage of the learning aid during the question.

4. The method of claim 1, wherein the knowledge state of the learner comprises a complete history of learner interactions with the e-learning plan.

5. The method of claim 1, wherein the machine learning model is configured to update the knowledge state of the learner differently for an incorrect attempt of the question than for use of the learning aid.

6. The method of claim 1, wherein personalizing the e-learning plan for the learner comprises determining to withhold a hint based on a determination that the first probability that the learner will answer the question correctly exceeds a first predetermined threshold and that the second probability that the learner will select the option to use the learning aid during the question is above a second predetermined threshold.

7. The method of claim 1, wherein personalizing the e-learning plan for the learner comprises determining to advance from a current question type to a subsequent question type based on a determination that the first probability that the learner will answer the question correctly exceeds a predetermined threshold, the current question type comprising a type of the first question.

8. One or more computer storage media storing computer-useable instructions that, when used by a computing device, cause the computing device to perform operations comprising:
    generating, using a machine learning model with inputs comprising an identification of a question and a knowledge state of a learner, a first probability that the learner will answer the question correctly and a second probability that the learner will select an option to use a learning aid during the question, wherein the machine learning model is a co-learning model that jointly models the first probability that the learner will answer the question correctly and the second probability that the learner will select the option to use the learning aid during the question;
    personalizing an e-learning plan for the learner based on at least one of the first or the second probabilities;
    providing an assessment to the learner based on the personalized e-learning plan; and
    providing an encoded interaction of the learner with the question, the encoded interaction at least indicating usage of the learning aid during the question, to facilitate updating the knowledge state of the learner based on the usage of the learning aid during the question.

9. The one or more computer storage media of claim 8, wherein the co-learning model is configured to jointly model the first probability and the second probability by sharing at least some network weights for separate tasks corresponding to the first and the second probabilities.

10. The one or more computer storage media of claim 8, the operations further comprising updating network weights of the machine learning model based on the usage of the learning aid during the question.

11. The one or more computer storage media of claim 8, wherein the knowledge state of the learner comprises a complete history of learner interactions with the e-learning plan.

12. The one or more computer storage media of claim 8, wherein the machine learning model is configured to update the knowledge state of the learner differently for an incorrect attempt of the question than for use of the learning aid.

13. The one or more computer storage media of claim 8, wherein personalizing the e-learning plan for the learner comprises determining to withhold a hint based on a determination that the first probability that the learner will answer the question correctly exceeds a first predetermined threshold and that the second probability that the learner will select the option to use the learning aid during the question is above a second predetermined threshold.

14. The one or more computer storage media of claim 8, wherein personalizing the e-learning plan for the learner comprises determining to advance from a current question type to a subsequent question type based on a determination that the first probability that the learner will answer the question correctly exceeds a predetermined threshold, the current question type comprising a type of the first question.

15. A computer system comprising:
    one or more hardware processors and memory configured to provide computer program instructions to the one or more hardware processors;
    a means for predicting, utilizing the one or more hardware processors and a machine learning model with inputs comprising an identification of a question and a knowledge state of a learner, a first probability that the learner will answer the question correctly and a second probability that the learner will select an option to use a hint during the question, wherein the machine learning model is a co-learning model that jointly models the first probability that the learner will answer the question correctly and the second probability that the learner will select the option to use the hint during the question; and a content delivery module in communication with the means for predicting and configured to utilize the one or more hardware processors to:
  receive, from the means for predicting, the first and second probabilities; and
  withhold the hint during the question based on a determination that the first probability that the learner will answer the question correctly exceeds a first predetermined threshold and that the second probability that the learner will select the option to use the hint during the question is above a second predetermined threshold.

16. The computer system of claim 15, wherein the co-learning model is configured to jointly model the first probability and the second probability by sharing at least some network weights for separate tasks corresponding to the first and the second probabilities.

17. The computer system of claim 15, wherein the means for predicting is configured to update network weights of the machine learning model based on usage of the hint during the question.

18. The computer system of claim 15, the knowledge state comprising a complete history of learner interactions with an e-learning plan.

19. The computer system of claim 15, wherein the means for predicting is configured to update the knowledge state of the learner differently for an incorrect attempt of the question than for use of the hint.

20. The computer system of claim 15, additionally comprising a personalized learning component configured to utilize the one or more hardware processors to personalize an e-learning plan for the learner by determining to advance from a current question type to a subsequent question type based on the determination that the first probability that the learner will answer the question correctly exceeds a predetermined threshold, the current question type comprising a type of the first question.

* * * * *